Sept. 8, 1942.　　　G. CHRISTENSON　　　2,295,160
PACKING ASSEMBLY
Filed March 11, 1939　　　2 Sheets-Sheet 1
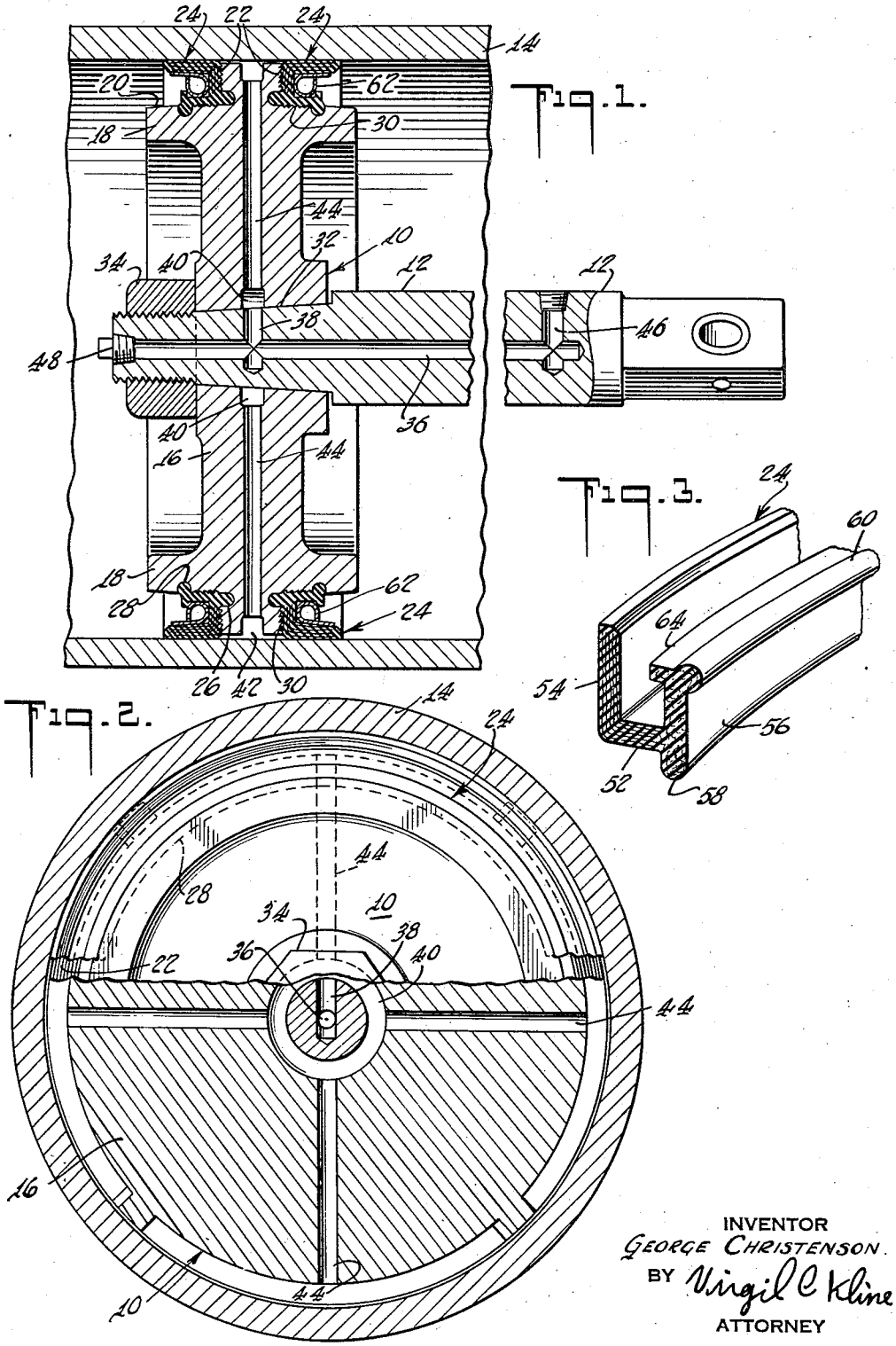

Sept. 8, 1942.    G. CHRISTENSON    2,295,160
PACKING ASSEMBLY
Filed March 11, 1939    2 Sheets-Sheet 2
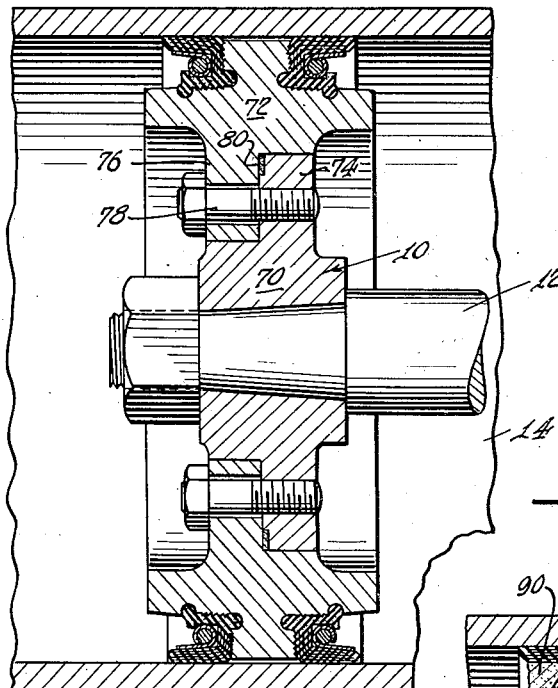
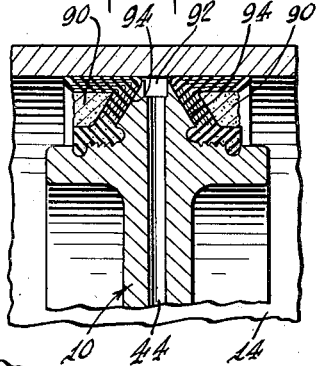
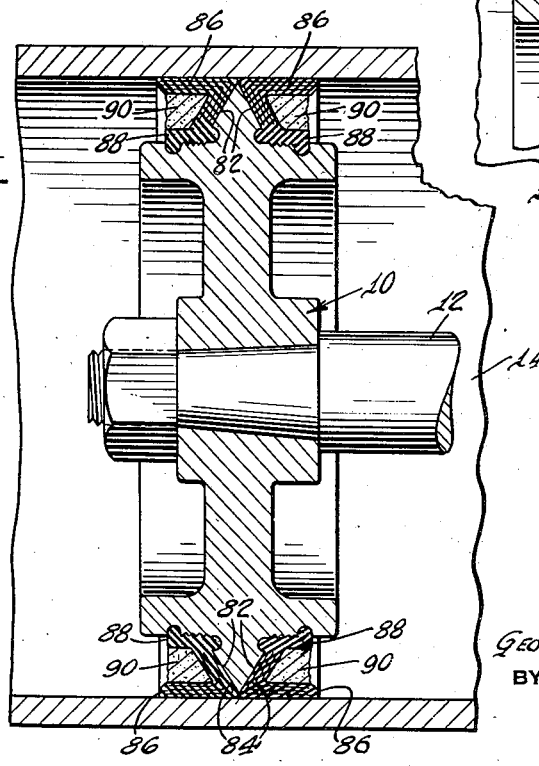
INVENTOR
GEORGE CHRISTENSON.
BY Virgil C. Kline
ATTORNEY Patented Sept. 8, 1942

2,295,160

UNITED STATES PATENT OFFICE 2,295,160

PACKING ASSEMBLY

George Christenson, Plainfield, N. J., assignor to Johns-Manville Corporation, New York, N. Y., a corporation of New York Application March 11, 1939, Serial No. 261,198

11 Claims. (Cl. 309—34)

The present invention relates to cylinder and piston assemblies, and particularly to such assemblies employed in power reverse mechanisms, air brake systems, and the like. More particularly, the invention is concerned with improvements in the pistons and the piston packings employed in assemblies of the above-referred to types.

Cylinder and piston assemblies, as heretofore provided, for example, in power reverse mechanisms, include a piston conventionally of the type illustrated in my Patent No. 2,218,638, issued October 22, 1940, comprising a multiplicity of assembled parts. A packing, often referred to in the art as a "cup packing," is carried by the piston, the packing having a base resting upon the piston head and an out-turned lip or flange for sliding and sealing engagement with the cylinder wall. The packing is retained in its proper position on the piston head by means of a keeper ring and a plurality of bolts or studs extending through the keeper ring and the base of the packing and into the piston head. In a double acting piston, as illustrated in my said copending application, a packing is employed adjacent each face of the piston head.

The present invention is particularly concerned with, and has for its principal object, the provision of an improved piston and packing assembly of simplified construction and adapted for ready assembly and disassembly.

A further principal object of the invention is the provision of a packing of improved type to be employed in an assembly as above referred to.

A further object of the invention is the provision of an improved piston packing assembly which will lessen any tendency of the piston to "shimmy."

My invention will be more fully understood and further advantages and objects thereof will become apparent when reference is made to the detailed description thereof which is to follow and to the accompanying drawings in which:

Fig. 1 is a fragmentary sectional view of a piston and cylinder assembly of the present invention;

Fig. 2 is a view partially in plan and partially in section of the assembly of Fig. 1;

Fig. 3 is a fragmentary view partially in perspective and partially in section illustrating a packing embodying the invention;

Fig. 4 is a view similar to Fig. 1 of a somewhat modified form of the invention;

Fig. 5 is a view similar to Fig. 1 of a further modification of the invention; and Fig. 6 is a fragmentary view of a modification of the construction of Fig. 5.

Referring now to the drawings, and particularly to Fig. 1, a piston cylinder assembly is illustrated comprising a double acting piston 10 carried by a piston rod 12 and adapted for reciprocation within a cylinder 14. The piston 10 includes a main body portion 16 having extending from each face a flange 18 defining an annular wall 20 spaced from the outer periphery of the piston. Between the walls 20 and the outer periphery of the piston are annular surfaces 22 forming seats for packings 24. The seats 22, adjacent their juncture with walls 20, include annular, preferably continuous grooves 26. Walls 20 are similarly provided with annular, preferably continuous grooves 28. The seats 22 and those portions of the walls 20 which lie adjacent the packings are provided with fine grooves of a sawtooth configuration in sectional view, as illustrated at 30, or are otherwise indented or roughened.

At the center of the piston 10 there is formed a bore 32 to receive the end of piston rod 12, the bore and the end of the piston rod preferably being of complemental frusto-conical configuration to permit them to be drawn into tight engagement by the nut or other securing means 34. Within piston rod 12 there is a longitudinally extending passageway 36 connecting with a radially extending passageway 38. The piston head includes a groove 40 extending around the periphery of the bore 32 and so located as to be in communication with the passageway or channel 38. The outer periphery of the piston head is provided with a groove 42 and grooves 40 and 42 are connected by a plurality of radially extending passageways or channels 44.

At an accessible location on piston rod 12 a bore 46 is formed connecting with the passageway 36. The mouth of the bore 46 is suitably threaded or otherwise fitted for connection with the nozzle of a pressure oiling device or grease gun of any conventional or suitable type. The passageway 36 at the outer end of the piston rod 12 is preferably fitted to receive a plug or the like 48.

The arrangement described above provides for the ready lubrication of the packings. Thus, a suitable pressure oiling device may be connected to the bore 46 and a lubricant forced through the passageways 46, 36 and 38 to the annular groove 40, where it is distributed to the passageways 44. The lubricant passes through passageways 44 to the outer annular groove 42 and comes into contact with the cylinder walls and the packings. The groove 42 is suitably made of a substantial width and depth, whereby it constitutes a storage means for the lubricant. Also, the passageways are of sufficiently large diameter to permit the lubricant to pass readily therethrough. Particularly where the piston cylinder assembly is supported horizontally, baffles 50 may be located in the groove 42 between the ends of passageways 44 to prevent excessive movement of the lubricant from the upper side of the piston to the lower side. Groove 40 may suitably be formed of somewhat greater width than the passageway 38 to insure communication therebetween in all permissible axial adjustments of the piston head relatively to the rod.

The packings 24 (see particularly Figs. 1 and 3) each comprise a base portion 52 to seat upon annular surface 22, an upstanding lip or flange 54 for sliding and sealing engagement with the cylinder wall, and an inner upstanding flange 56 for engagement with wall 20. At the juncture of the base 52 and flange 56, an extending bead 58 is formed for engagement within groove 26 and a similar bead 60 is formed at the upper end of flange 56 for engagement in groove 28.

The lip or flange 54 and base 52 of the packing are preferably formed of laminated asbestos or other fabric suitably impregnated with material such as a rubber composition, the impregnated fabric being suitably the same or similar to that heretofore conventionally employed for packings. Inner wall 56, including the beads 58 and 60, is preferably formed integrally with the base and lip and is preferably constituted of rubber composition or other plastic compound. However, the fabric reinforcement may be extended into these portions if desired. Also, they may include other than the rubber or plastic compounds.

In the assembling of each of the packings with the piston head, the base 52 is pressed against annular surface 22 and the inner face of flange 56 against wall 20, the teeth or the like 30 formed on such surface and wall biting into the packing. Beads 58 and 60 are forced into grooves 26 and 28, respectively, the preferably yieldable character of the packing composition permitting a tight fit therein. The flanges or lips of the packings are preferably held against the cylinder wall by expander rings 62, the latter being of any suitable or conventional construction. As illustrated, the packings may suitably include an integral flange 64 providing a retainer for the expander rings.

The present invention, as described above, provides a piston assembly of simplified construction which, moreover, operates in an improved manner and provides for ready installation and removal of the packings. In contrast to conventional structures, as exemplified by the piston disclosed in my copending application Serial No. 220,424, the piston head is formed of but a single element and the packings are secured thereto solely by coaction of grooves 26 and 28 with beads 58 and 60, respectively, and the bite of the serrations 30 with the material of the packings.

The system of connecting passageways, in addition to providing for ready lubrication of the packings, as previously described, presents the further advantage that leakage past the packings, in either direction of travel of the piston, may be readily determined, for example, by connecting a leakage gauge of suitable type with bore 46.

Referring now to Fig. 4, a somewhat modified construction is illustrated. In this form of the invention the piston 10 includes a central portion 70 secured on the piston rod 12 in accordance with conventional practice, and an outer portion 72. The central portion has an outer annular flange 74 and the outer portion 72 has an inner annular flange 76, the annular flanges 74 and 76 overlapping when the piston is assembled. Bolts or studs 78 are employed to secure the flanges, and hence, the piston, in assembled relationship. Preferably, a packing ring 80 of any suitable type is located between the adjacent faces of the flanges, suitably as illustrated, to insure against leakage through the piston head.

The piston head illustrated in Fig. 4 has the advantage that the outer portion 72 carrying the packings may be readily removed from the inner portion 74 for inspection or removal and replacement of either or both of the packings without the necessity of pulling the piston from the piston rod.

Referring now to Fig. 5, a further modification of the invention is shown. In this form, the piston 10 includes annular surfaces 82 to receive the bases of the packings, the annular surfaces converging as illustrated. In conjunction with this design of piston, packings are employed similar to those previously described, with the exception that the bases 84 of the packings extend at an angle to the lips or flanges 86 corresponding to the angle between the annular surfaces 82 and the cylinder wall. Also, the expander ring may be eliminated and the annular space between the flanges 86 and 88 substantially filled with a relatively soft, compressible oil-proof compound 90 which may suitably comprise a rubber composition as, or similar to, that employed for the inner flange and the beads of the packing. The soft, compressible compound 90 substituted for the expander rings, although particularly applicable to the packings of Fig. 5, may also be employed in conjunction with the packing rings of the type shown in Figs. 1, 3 and 4 if desired. In the construction disclosed in Fig. 5, the lips or flanges 86 of the packings are in contact with the cylinder wall substantially continuously throughout the width of the piston face. It has been determined that a construction of this type tends to eliminate any tendency of the piston to "shimmy" within the cylinder. Furthermore, this construction aids in preventing scoring of the cylinder walls by reducing the possibility of metal to metal contact between the piston and cylinder. Also, the packings conform more readily to the walls of cylinders of non-uniform diameter due to wear or other causes.

As illustrated in Fig. 6, the lubricating system previously described may be employed in conjunction with a piston arranged to carry packings of the type of those shown in Fig. 5. In this case an annular lubricant storing groove 92 is located between converging packing receiving surfaces 94. Radially extending passageways 44 connect the groove 92 with an annular groove surrounding the central piston rod receiving bore which, in turn, is in communication with a bore in the piston rod, all as previously described in connection with Fig. 1.

Although the invention has been described as embodied in double acting pistons, particularly of the type employed in power reverse mechanisms, it is not limited thereto and may be embodied in many types of assemblies. For example, the packings of the present invention may be used to advantage with air brake pistons and the like.

Having thus described my invention in rather full detail, it will be understood that these details need not be strictly adhered to, but that various changes and modifications will suggest themselves to one skilled in the art, all falling within the scope of the invention as defined by the subjoined claims.

What I claim is:

1. A piston packing comprising an annular base, an integral flange extending from the outer periphery of the base, and an integral flange extending from the inner periphery of the base, said base and said second-mentioned flange including integral extending beads for securing engagement with a piston head, and said second-mentioned flange including an expander ring retaining lip.

2. In combination, a piston including an annular portion and an upstanding annular wall at the inner edge thereof, and a packing carried by said piston, said packing comprising a base seated on the annular portion of said piston, a flange extending from the outer periphery of the base, and a flange extending from the inner periphery of the base and lying adjacent said annular wall, and means carried by said base and said second-mentioned flange and projecting from faces thereof and in securing engagement with said annular portion and said wall, respectively.

3. In combination, a piston including an upstanding annular wall spaced from the outer edge of the piston and a packing carried by the piston, the packing comprising a base seated on an annular portion of said piston, a flange extending from the outer periphery of the base, and a flange extending from the inner periphery of the base and lying against said wall, said annular portion of said piston and said wall including grooves and said base and said second-mentioned flange including integral beads in securing engagement with said grooves in said annular portion and wall, respectively.

4. In combination, a piston including an upstanding annular wall spaced from the outer edge of the piston and a packing carried by the piston, the packing comprising a base seated on an annular portion of said piston, a flange extending from the outer periphery of the base and a flange extending from the inner periphery of the base and lying against said wall, said annular portion of said piston and said wall including grooves and said base and said second-mentioned flange including integral beads in securing engagement with said grooves in said portion and wall, respectively, and teeth carried by said annular wall and annular portion and penetrating said base and second-mentioned flange, respectively.

5. A piston packing comprising an outer annular flange and an inner annular flange, a base integrally connecting said flanges and lying at an angle less and greater than a right angle, respectively, thereto, said base and said inner flange including extending beads for securing engagement with a piston head, and the space defined by said flanges and said base being substantially filled with a soft, compressible material.

6. A piston packing comprising an annular base, an integral flange extending from the outer periphery of the base, and an integral flange extending from the inner periphery of the base, a bead composed of a readily deformable, plastic composition integral with said base and projecting from a face thereof to contact a piston head, and a second bead composed of a readily deformable, plastic composition integral with said second-mentioned flange and projecting from a face thereof.

7. A piston packing comprising an annular base, an integral flange extending from the outer periphery of the base, and an integral flange extending from the inner periphery of the base, a bead composed of a readily deformable, plastic composition integral with said base and projecting from a face thereof to contact a piston head, and a second bead composed of a readily deformable, plastic composition integral with said second-mentioned flange and projecting from a face thereof, said base and first-mentioned flange comprising an impregnated fabric.

8. In combination, a piston including an upstanding annular wall spaced from the outer edge of the piston and projecting from a forward face thereof, a groove in said forward face at its junction with said wall and a groove in said wall at a line spaced from said forward face; a packing comprising a base seated on said forward face, a flange extending from the outer periphery of the base and a flange extending from the inner periphery of the base, and integral beads formed of a readily deformable, plastic material projecting from said base and second-mentioned flange, respectively, and in interlocking engagement with said grooves.

9. In combination, a piston including an upstanding annular wall spaced from the outer edge of the piston and projecting from a forward face thereof, a groove in said forward face at its junction with said wall and a groove in said wall at a line spaced from said forward face; a packing comprising a base seated on said forward face, a flange extending from the outer periphery of the base and a flange extending from the inner periphery of the base, and integral beads formed of a readily deformable, plastic material projecting from said base and second-mentioned flange, respectively, and in interlocking engagement with said grooves, said base and first-mentioned flange comprising an impregnated fabric.

10. A piston packing comprising an outer annular flange and an inner annular flange, a base integrally connecting said flanges and lying at an angle less and greater than a right angle, respectively, thereto, and beads formed of a readily deformable, plastic composition projecting from rearward faces of said base and flange, respectively.

11. In combination, a double acting piston including opposite packing receiving faces substantially meeting at the periphery of said piston, annular walls spaced from said periphery and projecting from said faces at angles greater than a right angle, grooves in said faces and in said annular walls, and packings seated on each of said faces, each of said packings including a base covering a face, an outer annular flange and an inner annular flange integrally connected with said base, and beads formed of a readily compressible, plastic material inserted in the grooves in the face and the corresponding wall.

GEORGE CHRISTENSON.